Aug. 21, 1956 N. J. HVISTENDAHL 2,759,712
AMALGAM MIXERS
Filed Oct. 12, 1953

INVENTOR.
Nels J. Hvistendahl
BY Robert H. Wendt
Att'y

United States Patent Office 2,759,712
Patented Aug. 21, 1956

2,759,712

AMALGAM MIXERS

Nels J. Hvistendahl, Sioux City, Iowa

Application October 12, 1953, Serial No. 385,337

11 Claims. (Cl. 259—72)

The present invention relates to amalgam mixers, and is particularly concerned with an improved mixing device utilizing the power of the dental engine for vibrating a previously prepared capsule containing the ingredients for an amalgam.

The present application is a continuation-in-part of my prior application, Ser. No. 277,361, on an Amalgam Mixer, now abandoned, and relates to a further improvement of the amalgam mixer shown in said prior application.

One of the objects of the invention is the provision of an improved form of capsule by means of which capsules can be prepared in advance, with the ingredients therein separated by a partition, and the partition is provided with a pull string by means of which the partition may be withdrawn or displaced sufficiently to permit the mercury to come into contact with the powders with which the mercury is to be mixed.

Another object of the invention is the provision of an improved amalgam mixer which may be held in the hand and pressed against the belt of a dental engine which rotates a pulley in the mixer and produces a rapid vibration of a capsule containing the amalgam.

Another object of the invention is the provision of an improved amalgam mixer which is provided with a vibrator having positive means for securing and housing the capsule so that there is no danger of the capsule becoming loose or the corks coming out during the mixing operation.

Another object of the invention is the provision of an improved amalgam mixer which is simple in construction, sturdy, positive in its action, and adapted to be used for a long period of time without necessity for repairing or replacing any of its parts.

Another object of the invention is the provision of an improved amalgam capsule which utilizes the glass novocain carpules which are available in every dentist's office and which enables the user to prepare the mixtures in advance and to charge the capsules with mercury and powder which are separated in the capsule by a partition.

Other objects and advantages of the invention will be apparent from the following description and the accompanying drawings, in which similar characters of reference indicate similar parts throughout the several views.

Referring to the single sheet of drawings accompanying this specification,

Figure 5:
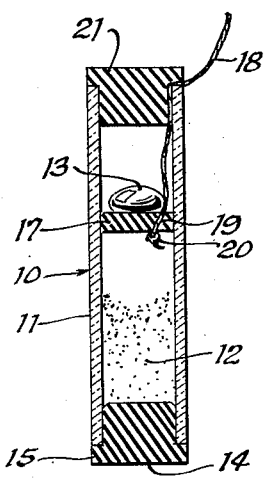
Fig. 5 is an axial sectional view, taken through a completed capsule.
Figure 6:
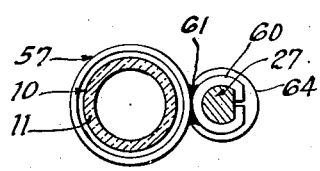
Fig. 6 is a sectional view, taken on the plane of the line 6—6 of Fig. 2, looking in the direction of the arrows.

Referring to Fig. 5, 10 indicates in its entirety a complete capsule embodying the invention, including a cylindrical glass tube 11, such as that which is used in a Novocain carpule; and these glass tubes are readily available in any dental office, since they result from the use of the Novocain; and they may be cut to any suitable length for receiving different amounts of the alloy powder 12 and the mercury 13, which are used for making an amalgam.

The dentist may thus make his own capsules and may have on hand a plurality of capsules charged with suitable amounts of powder and mercury for making amalgam in the amounts required for different size fillings.

Each end of the tube 11 is closed by means of a resilient rubber or cork plug 14, the plug being cylindrical in shape and having a circular head 15 overlying and protecting the end of the glass tube 11.

The mercury 13 and powdered alloy 12 are separated by a thin rubber or cork plug partition 17, which carries a pull string 18, extending through an aperture 19 in the partition and provided with a knot 20.

The draw string 18 extends out of the capsule 10 between the upper plug 21 and the glass wall, the plug making a liquid-tight seal about the string.

Figures 1, 2, 3:
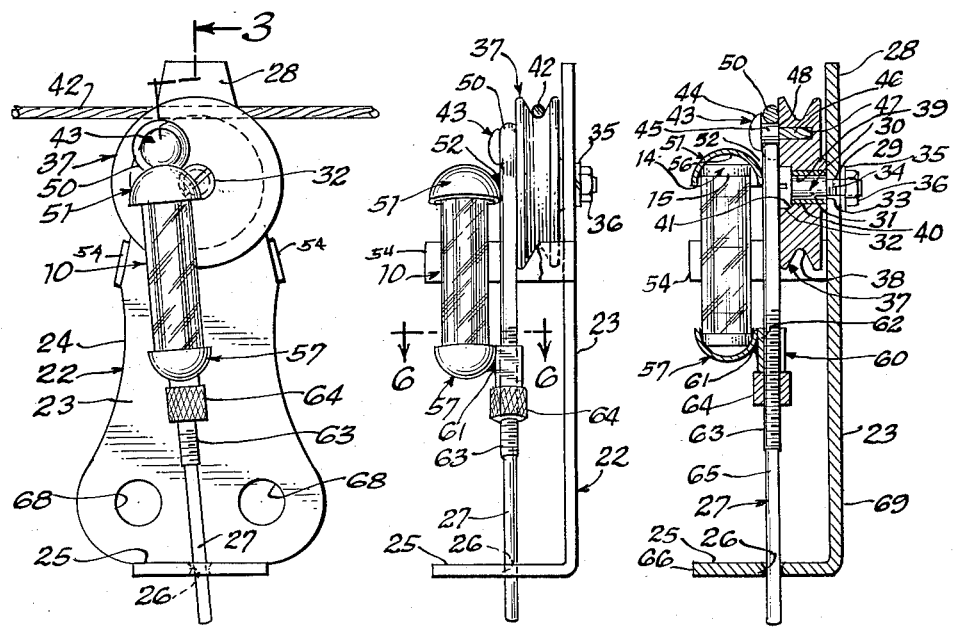
Fig. 1 is a front elevational view of an amalgam mixer embodying the invention, shown in connection with the belt of a dental engine which is used for driving the vibrator.
Fig. 2 is a side elevational view, taken from the right of Fig. 1.
Fig. 3 is a sectional view taken on the plane of the line 3—3 of Fig. 1.

The amalgam mixer, Fig. 1, is indicated in its entirety by the numeral 22, and it preferably includes a suitable handle 23 which may be formed of sheet metal and which is provided with concave edges 24 for fitting more readily into the hand.

At one end the handle 23 is provided with a transverse flange 25 having a through bore 26 acting as a guide for a reciprocating rod 27. The handle 23 may taper toward its other end 28 and is provided with a through bore 29 near the other end for mounting a shaft 30.

The shaft 30 has a cylindrical portion 31 serving as a journal or trunnion and is provided with a head 32 having a screw driver slot. The shaft 30 has an annular shoulder 33 engaging the handle 23, and it has a reduced threaded portion 34 passing through the aperture 29.

A lock washer 35 and a nut 36 secure the shaft to the handle. The shaft is used to support a pulley 37 for rotation on the shaft, and the pulley may comprise a circular metal member provided with a V-groove 38 extending about its periphery and having a bore 39 which may be provided with a bearing bushing 40.

The pulley 37 may also have a counterbore 41 for receiving the head 32 of shaft 30. The pulley may in all respects be of a construction similar to those employed on the dental engine arm, and the groove 38 is adapted to receive the round belt 42, which is driven by the dental engine.

Pulley 37 is provided with an eccentric pin 43 in the form of a screw bolt having a head 44, a cylindrical body 45, and a reduced portion 46, which is driven into bore 47 and held frictionally therein. Shoulder 48 engages face of pulley.

The plunger or reciprocating rod 27 comprises a cylindrical metal rod or wire which is formed at its upper end with a circular eye 50 for receiving the cylindrical portion 45 of the eccentric pin 43. The rod 27 is flattened on its rear side and slides on pulley face.

As the pulley rotates the pin 43 moves in a circle and causes the rod 27 to reciprocate in the guide bore 26, and also to move laterally in a kind of orbit at its upper end.

The rod 27 is provided near its upper end with a fixed metal housing member 51, which is adapted to receive one end of the capsule 10, and is fixedly soldered or brazed to the rod 27 at 52. Capsule housing 51 is partially spherical and tends to center the cork 14, which engages centrally in cavity 56.

Engagement of housing with the cork head 15 protects the glass against breakage; and the housing 51 tends to press the cork into the glass capsule and hold it securely.

The rod 27 also supports another similar housing member 57, for receiving the other end of the capsule in the same manner.

Lower housing 57 is supported by a cylindrical tube 60, to which it is soldered or brazed at 61; and the tube 60 has a through bore 62 with a flat on one side sliding on the rod 27, but held against rotation by the flat side. Rod 27 is provided with a slightly enlarged threaded portion 63 for receiving a knurled nut 64, which engages the lower end of the tube 60.

Threaded portion 63 is enlarged over the lower end 65 of the rod 27 to permit it to be threaded and to permit the threaded nut to be slid on from the lower end.

The nut 64 may be withdrawn downward far enough to separate the housings 51 and 57 so that a capsule may be removed or inserted at the open front 54. Then the two housings 51 and 57 are held in engagement with the ends of the capsule; and the nut 64 is again threaded upward on the rod 27 until it engages the tube 60 and firmly holds the capsule in the housings 51 and 57.

Thus the capsule may be mounted on the reciprocating rod 27 in such a firm manner that it cannot be displaced or shaken loose; and the housings assure the securement of the corks in the capsule in the vibrating action.

The handle 23 is provided with two side flanges 54, extending at right angles to the body of the handle and ending in the same plane as the end flange 25.

Figure 4:
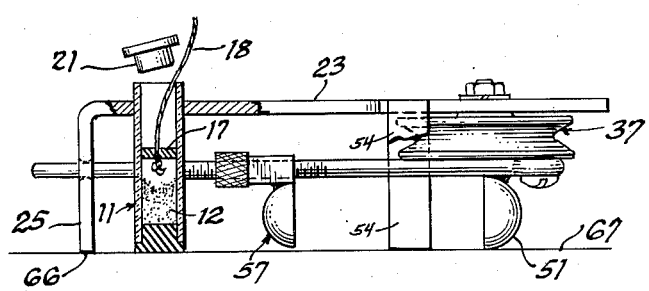
Fig. 4 is a side elevational view of the amalgam mixer lying upon a suitable support, such as a table, showing its use in the charging of the capsules.

Flanges 54 and the end flange 25 may also serve the useful purpose of supporting the amalgam mixer by means of their ends on a table 67 or other support as shown in Fig. 4. Here the handle 23 is used for supporting a pair of capsule tubes 11 while they are being loaded, and for this purpose the handle has a pair of apertures 68. The apertures are disposed on opposite sides of the rod 27 so that the rod does not interfere with them.

The operation of my amalgam mixer is as follows:

Capsules may be made of any suitable length for receiving charges of different size and a number of capsules may be charged in advance since the mercury 13 is kept separated from the powder 12 by the partition 17.

When it is desired to mix a supply of amalgam, the upper cork 21 of a capsule is loosened sufficiently while holding the capsule in vertical position, and the pull string 18 is pulled to dislodge the partition 17. The partition may be pulled out entirely and the cork replaced, leaving the mercury in engagement with the powder.

The capsule is then mounted in the housings 51 and 57, where the corks are clamped by means of the nut at 64. The amalgam mixer may then be grasped in one hand with the palm of the hand on the side 69, away from the mechanism; and the pulley 37 may have its groove pressed against the belt 42 of the dental engine.

When the dental engine is energized the belt will drive the pulley 37, and the eccentric pin 43 will move in an orbit at a high rate of speed, causing the capsule to be reciprocated endwise and laterally and effecting a thorough mixture of its contents in a very short time.

The present mixer is adapted to assure the thorough mixing of the ingredients of the amalgam in a minimum amount of time, saving the time of the dentist during appointments; and capsules may be prepared at other times so that the preparation of amalgam and making of fillings may be expedited during appointments.

The vibration of the capsule produces a very thorough and satisfactory mixture and assures a better amalgam with a minimum amount of labor.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. An amalgam mixer comprising a portable handle member provided at one end with a transverse shaft, a grooved pulley rotatably mounted on said shaft, a reciprocating connecting rod having one end pivotally mounted on said pulley at a point eccentric with respect to said shaft, guide means carried by the opposite end of the handle for slidably mounting said rod, a cap having a cavity for a capsule fixedly mounted on said rod, a second cap having an opposed cavity slidably mounted on said rod and a threaded member threaded on said rod and urging said caps toward each other to secure an amalgam capsule between them, the capsule being subjected to vibration as the pulley is pressed against the belt of a dental engine under motion.

2. An amalgam mixer comprising a portable handle member provided at one end with a transverse shaft, a grooved pulley rotatably mounted on said shaft, a reciprocating connecting rod having one end pivotally mounted on said pulley at a point eccentric with respect to said shaft, guide means carried by the opposite end of the handle for slidably mounting said rod, a cap having a cavity for a capsule fixedly mounted on said rod, a second cap having an opposed cavity slidably mounted on said rod and a threaded member threaded on said rod and urging said caps toward each other to secure an amalgam capsule between them, the capsule being subjected to vibration as the pulley is pressed against the belt of a dental engine under motion, the said rod being formed with a flat side portion engaging in a complementary bore in a guide carried by the second cap for preventing rotation of the second cap on the rod.

3. An amalgam mixer comprising a portable handle member provided at one end with a transverse shaft, a grooved pulley rotatably mounted on said shaft, a reciprocating connecting rod having one end pivotally mounted on said pulley at a point eccentric with respect to said shaft, guide means carried by the opposite end of the handle for slidably mounting said rod, a cap having a cavity for a capsule fixedly mounted on said rod, a second cap having an opposed cavity slidably mounted on said rod and a threaded member threaded on said rod and urging said caps toward each other to secure an amalgam capsule between them, the capsule being subjected to vibration as the pulley is pressed against the belt of a dental engine under motion, the said shaft comprising a headed metal member having a cylindrical journal portion and a reduced threaded portion, said threaded portion passing through a bore in said handle and a threaded member on said threaded portion for securing the shaft in place.

4. An amalgam mixer comprising a portable handle member provided at one end with a transverse shaft, a grooved pulley rotatably mounted on said shaft, a reciprocating connecting rod having one end pivotally mounted on said pulley at a point eccentric with respect to said shaft, guide means carried by the opposite end of the handle for slidably mounting said rod, a cap having a cavity for a capsule fixedly mounted on said rod, a second cap having an opposed cavity slidably mounted on said rod and a threaded member threaded on said rod and urging said caps toward each other to secure an amalgam capsule between them, the capsule being subjected to vibration as the pulley is pressed against the belt of a dental engine under motion, the said capsule comprising a transparent tube open at both ends and provided with a resilient rubber plug in each end, the plugs having portions projecting from and overlying the tube and being engaged and held in the tube during the mixing action by the caps embracing the tube and engaging the plugs, said resilient plugs absorbing a portion of the vibration to prevent breakage of said tube and prevent loosening of said threaded member.

5. An amalgam mixer comprising a portable handle member provided at one end with a transverse shaft, a grooved pulley rotatably mounted on said shaft, a reciprocating connecting rod having one end pivotally mounted on said pulley at a point eccentric with respect to said shaft, guide means carried by the opposite end of the handle for slidably mounting said rod, a cap having a cavity for a capsule fixedly mounted on said rod, a second cap having an opposed cavity slidably mounted on said rod and a threaded member threaded on said rod and urging said caps toward each other to secure an amalgam capsule between them, the capsule being subjected to vibration as the pulley is pressed against the belt of a dental engine under motion, the said second-mentioned cap being fixedly mounted upon a tube having a bore slidably mounted on said rod, the said latter tube being engaged by said threaded member.

6. An amalgam mixer comprising an elongated tapered metal member provided with a transverse flange at one end having a through bore, said member having a second bore through its opposite end, a threaded shaft member having a head and a cylindrical journal and a reduced threaded portion, said threaded portion being located in said latter bore, threaded means on said threaded portion clamping said member between an annular shoulder on said shaft and said threaded means, a pulley having a peripheral driving groove for receiving a belt, said pulley being mounted on said shaft and having a bore for receiving the journal and a counterbore for receiving the head, a crank pin having a head, a cylindrical journal and a reduced threaded portion threaded into a threaded bore in said pulley eccentrically with respect to said shaft, a reciprocating rod having an eye mounted on said crank pin and having its opposite end slidably mounted in said first-mentioned through bore, and a pair of socketed members mounted on said rod for supporting a capsule containing the ingredients for an amalgam, the said pulley being pressed against the belt of a dental engine under motion and causing the pulley to rotate and the rod to reciprocate rapidly and subjecting the capsule to a rapid mixing action.

7. An amalgam mixer comprising an elongated tapered metal member provided with a transverse flange at one end having a through bore, said member having a second bore through its opposite end, a threaded shaft member having a head and a cylindrical journal and a reduced threaded portion, said threaded portion being located in said latter bore, threaded means on said threaded portion clamping said member between an annular shoulder on said shaft and said threaded means, a pulley having a peripheral driving groove for receiving a belt, said pulley being mounted on said shaft and having a bore for receiving the journal and a counterbore for receiving the head, a crank pin having a head, a cylindrical journal, and a reduced threaded portion threaded into a threaded bore in said pulley eccentrically with respect to said shaft, a reciprocating rod having an eye mounted on said crank pin and having its opposite end slidably mounted in said first-mentioned through bore, and a pair of socketed members mounted on said rod for supporting a capsule containing the ingredients for an amalgam, the said pulley being pressed against the belt of a dental engine under motion and causing the pulley to rotate and the rod to reciprocate rapidly thereby subjecting the capsule to a rapid mixing action, the said socket members comprising a pair of partially cylindrical members with a tapered socket adapted to center the capsule and engage the heads of the plugs for closing the ends of the capsule.

8. An amalgam mixer comprising an elongated tapered metal member provided with a transverse flange at one end having a through bore, said member having a second bore through its opposite end, a threaded shaft member having a head and a cylindrical journal and a reduced threaded portion, said threaded portion being located in said latter bore, threaded means on said threaded portion clamping said member between an annular shoulder on said shaft and said threaded means, a pulley having a peripheral driving groove for receiving a belt, said pulley being mounted on said shaft and having a bore for receiving the journal and a counterbore for receiving the head, a crank pin having a head, a cylindrical journal and a reduced threaded portion threaded into a threaded bore in said pulley eccentrically with respect to said shaft, a reciprocating rod having an eye mounted on said crank pin and having its opposite end slidably mounted in said first-mentioned through bore, and a pair of socketed members mounted on said rod for supporting a capsule containing the ingredients for an amalgam, the said pulley being pressed against the belt of a dental engine under motion and causing the pulley to rotate and the rod to reciprocate rapidly thereby subjecting the capsule to a rapid mixing action, the said socketed members comprising a pair of partially cylindrical members provided with a tapered socket for embracing the end of the capsule, the said capsule comprising a transparent tubular member open at both ends and provided with a charge of mercury and amalgam powder, and with a plug at each end, the said socketed members engaging the plug and assuring closure of the capsule during mixing action.

9. An amalgam mixer comprising an elongated tapered metal member provided with a transverse flange at one end having a through bore, said member having a second bore through its opposite end, a threaded shaft member having a head and a cylindrical journal and a reduced threaded portion, said threaded portion being located in said latter bore, threaded means on said threaded portion clamping said member between an annular shoulder on said shaft and said threaded means, a pulley having a peripheral driving groove for receiving a belt, said pulley being mounted on said shaft and having a bore for receiving the journal and a counterbore for receiving the head, a crank pin having a head, a cylindrical journal and a reduced threaded portion threaded into a threaded bore in said pulley eccentrically with respect to said shaft, a reciprocating rod having an eye mounted on said crank pin and having its opposite end slidably mounted in said first-mentioned through bore, and a pair of socketed members mounted on said rod for supporting a capsule containing the ingredients for an amalgam, the said pulley being pressed against the belt of a dental engine under motion and causing the pulley to rotate and the rod to reciprocate rapidly and subjecting the capsule to a rapid mixing action, the said socketed members comprising a pair of partially cylindrical members with a tapered socket for embracing the end of the capsule, one of said socketed members being fixedly secured to said rod and the other of said socketed members being slidably mounted on said rod, said rod having a threaded portion and a threaded member for urging said socketed members toward each other to grip a capsule.

10. An amalgam mixer assembly comprising, a supporting body provided with a plurality of legs and with a pair of through apertures in the body adapted to receive and support a capsule when the body is resting on its legs on a table or similar support, the said body being provided with a supporting stud and a pulley rotatably mounted thereon, a reciprocating rod pivotally connected to said pulley and slidably mounted in one of said legs, the said rod being provided with a tapered cap, a second tapered cap slidably mounted on said rod and engaged by a nut threadedly mounted on a threaded portion of said rod, and a capsule comprising a transparent tube open at both its ends and provided with an inner partition slidably mounted in said tube, a rubber plug for each end of said tube having an outwardly projecting cover flange engaging and overlying each end of the tube, and a flexible member extending between one plug and the tube and attached to the partition, said tube containing liquid mercury on one side of the partition and the other ingredients of an amalgam on the other side of the partition, the said caps being urged together by said threaded member and engaging the cover flanges on said plugs for resiliently clamping said tube to said rod for vibration with the rod, said rubber plugs absorbing a portion of the vibration to prevent breakage of said tube and prevent loosening of said nut.

11. In an amalgam mixer, the combination of an oscillating member, a capsule holder, said holder comprising a longitudinally extending track member secured to the oscillating member at one end, a fixed cup member rigidly carried by one end of said track member, a sleeve slidably mounted on said track member for movement towards and away from said fixed cup member, a movable cup member carried by said sleeve in alignment with said fixed cup member, a thread carried by said track member, and a threaded member engaging said thread on said track member, urging said sleeve and movable cup member toward said fixed cup member, said sleeve being disposed between said threaded member and said fixed cup member, and said threaded member being adapted to hold an amalgam capsule fixedly between said cups for oscillation with said oscillating member.

References Cited in the file of this patent
UNITED STATES PATENTS

| | | |
|---|---|---|
| 1,377,680 | Haight | May 10, 1921 |
| 1,523,113 | Fowler | Jan. 13, 1925 |
| 1,867,494 | Buechner | July 12, 1932 |
| 2,286,600 | Chott | June 16, 1942 |
| 2,448,840 | Steward | Sept. 7, 1948 |
| 2,527,991 | Greenberg | Oct. 31, 1950 |
| 2,527,992 | Greenberg | Oct. 31, 1950 |
| 2,660,171 | Dickinson | Nov. 24, 1953 |